Feb. 1, 1955   B. B. BOCKTING   2,700,908
BALL FORMING DIES
Filed July 18, 1949   8 Sheets-Sheet 1

INVENTOR.
BENJAMIN B. BOCKTING
BY Alfred R. Fuchs
ATTORNEY

INVENTOR.
BENJAMIN B. BOCKTING
BY Alfred R. Fuchs
ATTORNEY

Feb. 1, 1955

B. B. BOCKTING 2,700,908

BALL FORMING DIES

Filed July 18, 1949

INVENTOR.
BENJAMIN B. BOCKTING
BY
Alfred R. Fuchs
ATTORNEY

Feb. 1, 1955   B. B. BOCKTING   2,700,908
BALL FORMING DIES

Filed July 18, 1949   8 Sheets-Sheet 4

INVENTOR.
BENJAMIN B. BOCKTING
BY
Alfred R. Fuchs
ATTORNEY

INVENTOR.
BENJAMIN B. BOCKTING
BY
Alfred R. Fuchs
ATTORNEY

Feb. 1, 1955     B. B. BOCKTING     2,700,908
BALL FORMING DIES

Filed July 18, 1949     8 Sheets-Sheet 6

INVENTOR.
BENJAMIN B. BOCKTING
BY
Alfred R. Fuchs
ATTORNEY

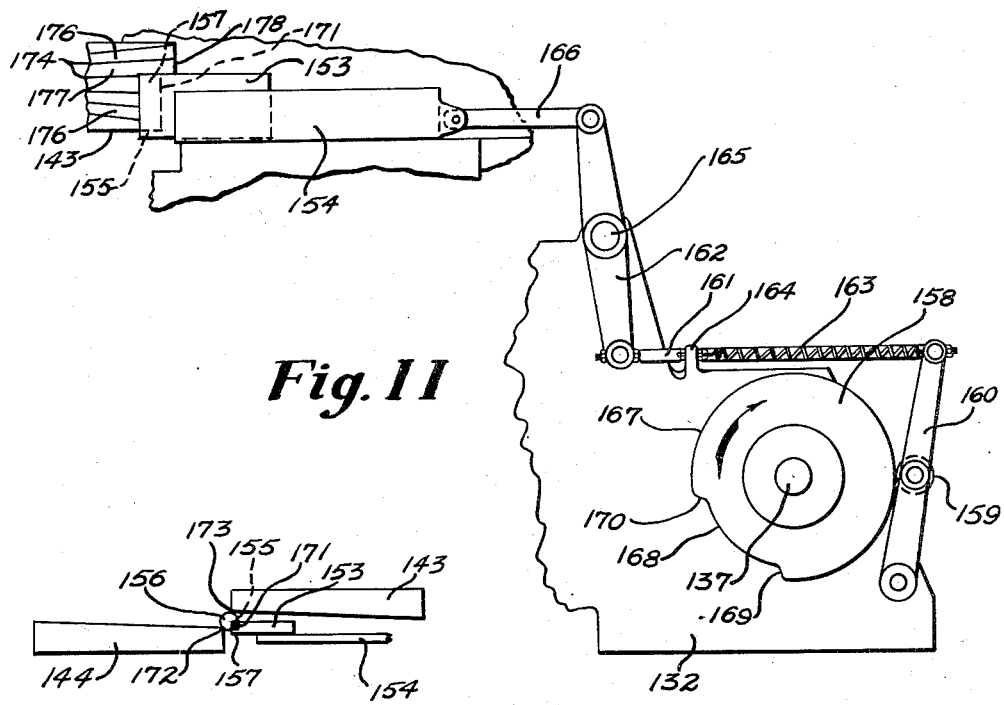
*Fig. 11*
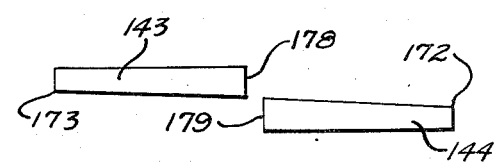
*Fig. 14*
*Fig. 15*
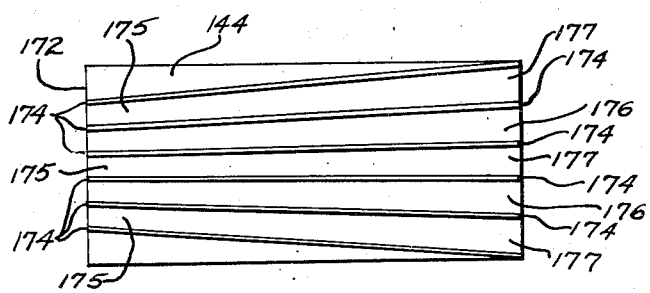
*Fig. 16*
INVENTOR.
BENJAMIN B. BOCKTING

INVENTOR.
BENJAMIN B. BOCKTING
BY
ATTORNEY

United States Patent Office 2,700,908
Patented Feb. 1, 1955

2,700,908

BALL FORMING DIE

Benjamin B. Bockting, near Lee's Summit, Mo., assignor to Armco Steel Corporation, a corporation of Ohio Application July 18, 1949, Serial No. 105,407

2 Claims. (Cl. 80—18)

My invention relates to ball forming dies.

While there are several methods of forming balls from bars that are circular in cross section in which the bars are fed between grooved dies, lengths of said rods being, previous to feeding between the dies, cut off so as to provide what might be referred to as a blank made up of a length of such rod, which is fed between the dies for cooperative action of said dies thereon, in all such dies the cooperating grooved members of the dies have the centers of curvature thereof substantially lying on the line of separation of the dies.

In such methods of forming balls, difficulty is encountered in getting a good separation of the ball formations that are connected together by narrow neck portions and to get a relatively smooth surface on the ball portion where the ball formations were connected together previous to separation. It is the principal purpose of my invention to provide a new and improved method of forming balls by means of cooperating dies by a rolling operation, in which the dies are so related to each other that the balls will have a more true spherical shape when the forming operation by means of the dies is completed and a more clean separation of the previously connected ball formations than has been previously the case.

I accomplish this purpose by causing the rotation of the different ball formations that are being formed from the rod-like member about different axes as the rolling operation proceeds. In other words, the longitudinally adjacent portions of the rod-like member from which the balls are to be formed rotate about different axes that are offset from each other.

This facilitates the separation of the ball formations that are rolled on the bar, and furthermore causes a change in the axis about which each portion, after separation, will rotate and thereby tends to form a more nearly perfect sphere. The separated ball formations do not rotate about different axes that are parallel to each other, but at an angle to each other to produce this better shape of the balls when leaving the dies.

More specifically my invention comprises providing a pair of dies that cooperate to roll a length of rod therebetween to provide ball formations thereon that are separated from each other after being formed, that have alternate deep and shallow grooves therein, the shallow grooves of the one die lying opposite the deep grooves of the other die and all the grooves being transversely curved on substantially the same arc, but the center of curvature of adjacent grooves being out of alignment with each other. This causes the centers of curvature of all of the grooves to lie outside the line of separation of the dies, the center of curvature of the deeper grooves lying inside the outline of the dies, and the center of curvature of the shallow grooves lying outside the outline of the dies.

My invention can be applied to any pair of dies that apply a rolling action to the heated length of rod that serves as the blank for forming a plurality of balls simultaneously. Thus my invention can be applied to a pair of grooved roller dies similar to those shown in the patent of myself and F. H. G. Brandt, No. 2,048,917, patented July 28, 1936, or to a roller die and a stationary die that gradually approaches the roller die, the stationary die being made in the form of a curved shoe, such as shown in the patent to Canda, No. 1,225,765, patented May 15, 1917, or to a pair of dies that reciprocate relative to each other, one of said dies, preferably, moving back and forth and the other die being stationary.

As a result of the form of dies used in conjunction with my invention, the ball formations have a combination of torsion and shear exerted on the connecting portions thereof to aid in the separation of the connected series of ball formations that are rolled from the rod-like blank. This aids greatly in the rapid separation of the ball formations from each other so as to provide the separate balls that are the product of my improved method.

Other objects and advantages of my invention will appear as the description of the drawings proceeds. I desire to have it understood, however, that I do not intend to limit myself to the particular details shown or described, except as defined in the claims.

In the drawings:

Fig. 11 is a fragmentary view in elevation, showing the means for feeding the blanks between the dies.

Fig. 14 is a diagrammatic plan view of the dies and starting finger at the beginning of the ball rolling stroke.

Fig. 15 is a diagrammatic view of the cooperating dies at the end of the ball rolling stroke, and Fig. 16 is a face view of one of the dies detached.

Figure 1:
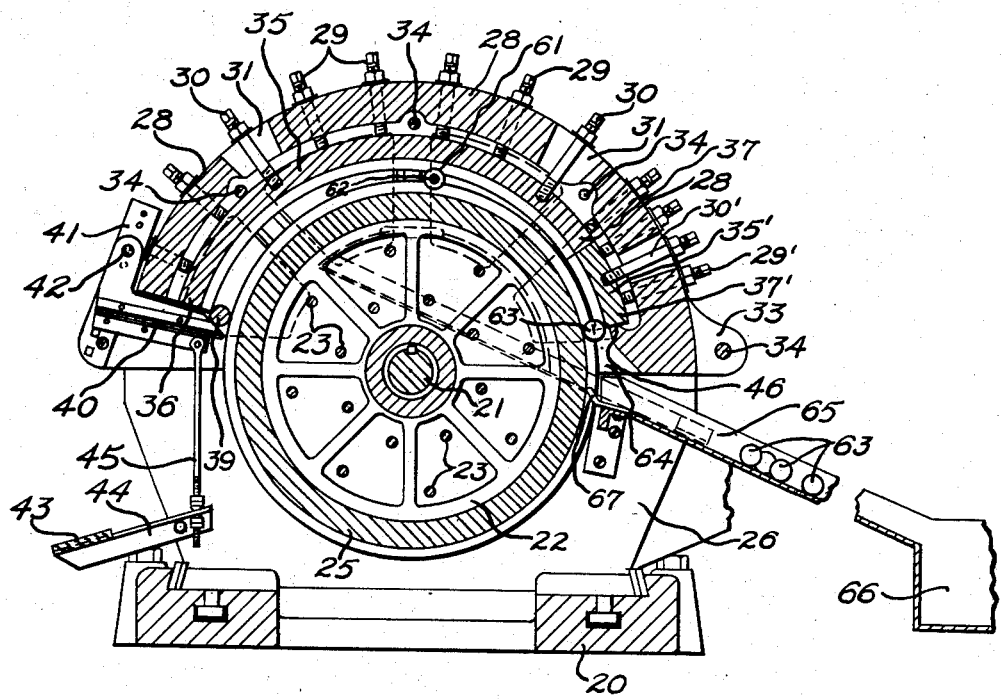
Fig. 1 is a view in vertical section through a machine for rolling balls from lengths of rod that embodies dies made in accordance with my invention.

Referring in detail to the drawings, in Fig. 1 is shown a ball forming machine that has a base 20, upon which is mounted in a suitable manner for rotation in suitable bearings, a shaft 21, which has a pair of rotating members 22 mounted thereon that are connected together by suitable securing means, such as the bolts 23, and which have conical faces 24 for wedgingly mounting a die member 25 thereon.

The frame of the machine also has upstanding frame portions 26 that have grooves 27 therein for receiving the arcuate block 28, which has a plurality of adjusting screws 29 and 30 mounted therein. The screws 29 are screw-threadedly mounted in openings in the block 28 and the screws 30 are slidably mounted in openings 31 in said block. The upper portion of the frame that has the grooves 27 therein comprises a pair of curved bars 32 that have ears 33 thereon, through which the transversely extending bolts 34 extend that secure said upper curved bars 32 to the upstanding side portions 26 of the frame. The screw-threaded members 29 and 30 cooperate to locate the position of the stationary arcuate die 35. Said screw-threaded members are so adjusted that the die 35 gradually approaches the roller die from the entrance end 36 thereof to the exit 37 thereof, as will be obvious from Fig. 1. The position of the dies crosswise or axially of the machine is adjusted by means of the screw-threaded members 38 that are mounted in screw-threaded engagement in suitable openings in the upstanding frame members 26.

Suitable means may be provided for feeding rod-like blanks of predetermined length 39 into the machine, the particular means shown for accomplishing this being shown merely by way of example, and comprises an inclined shelf 40, which is pivotally mounted on a bracket 41 at 42, and which can be swung about the pivot by means of a treadle 43 mounted on a lever 44 that is connected by means of a rod-like member 45 with the shelf 40, the rod-like member 45 being pivotally connected with said shelf, as will be clear from Fig. 1. When the shelf is in the position shown in Fig. 1 it prevents downward movement of the rod-like member 39, and when the parts are moved from a lowered position to the position shown in Fig. 1 the rod-like member 39 is fed into cooperative relation to the dies 35 and 25. The arcuate bar-like member 28 is provided with an abutment at 46 against which the one end of the arcuate die 35' engages to prevent endwise movement thereof.

Figure 3:
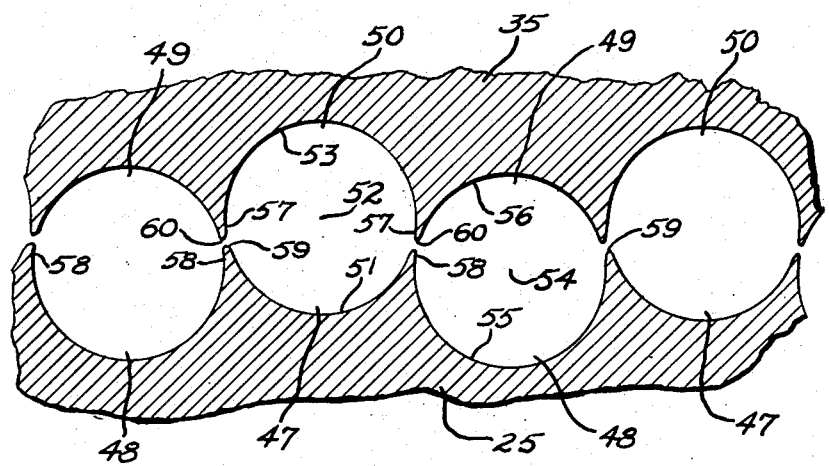
Fig. 3 is an enlarged fragmentary sectional view of the dies shown in Fig. 2.
Figure 2:
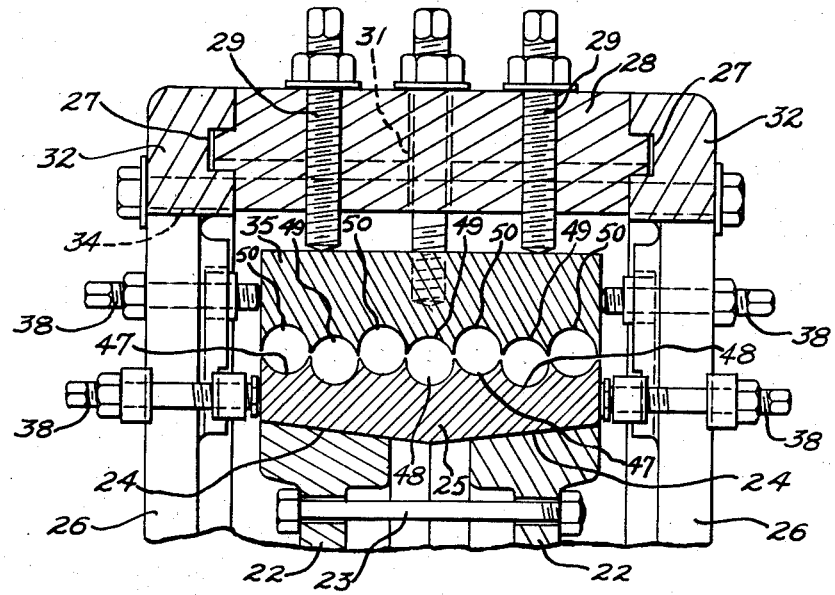
Fig. 2 is a transverse sectional view through the dies near the discharge end of the machine.
Figure 5:
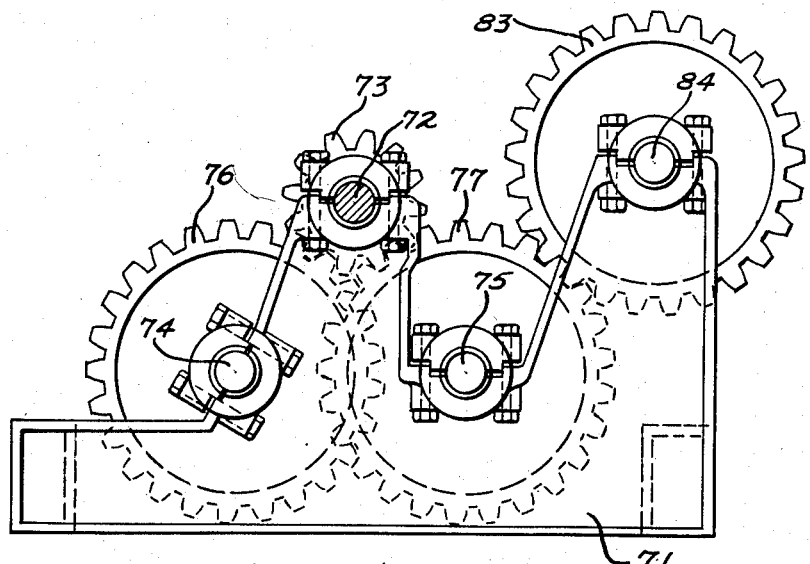
Fig. 5 is an end view of the machine shown in Fig. 4, showing the driving means therefor.
Figure 4:
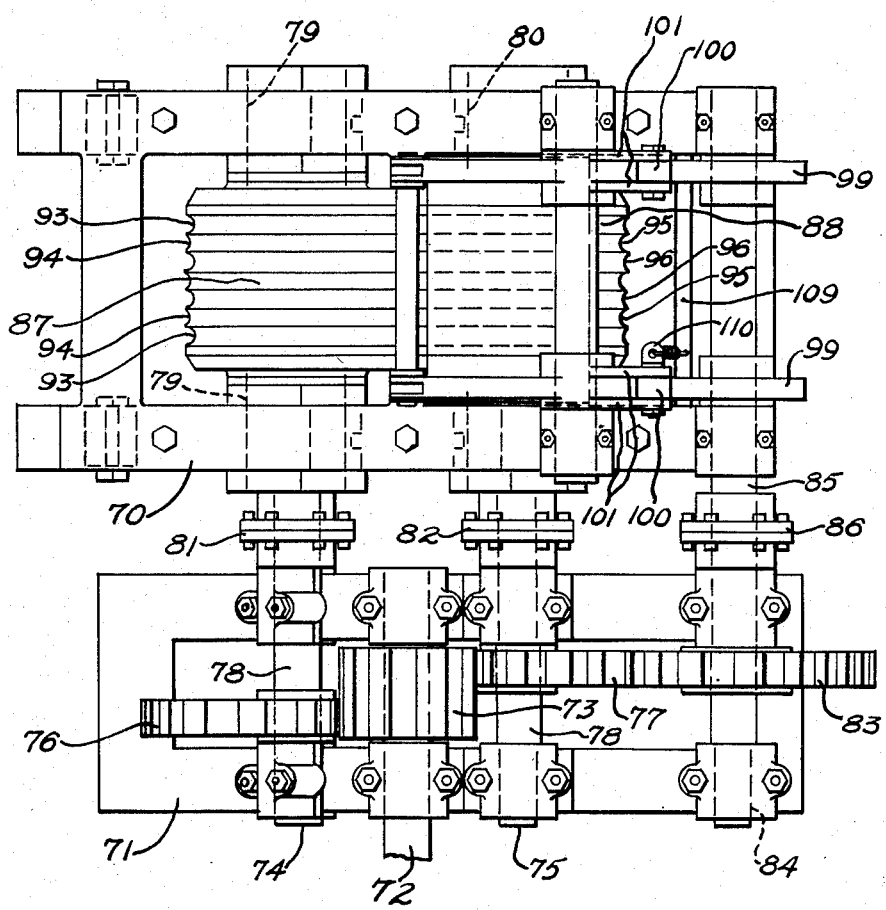
Fig. 4 is a top plan view of a machine utilizing a pair of roller dies for forming balls from lengths of rod utilizing dies made in accordance with my invention.

Upon reference to Figs. 2 and 3 it will be noted that the die 25 has alternate shallow grooves 47 and deep grooves 48 therein, the grooves 47 and 48 all being annular and all being curved in cross section on an arc of the same radius. However, the center of curvature of each of the arcs 47 lies outside the periphery of the die 25, while the center of curvature of each of the arcs 48 lies inside the periphery of the die 25. The die 35 is provided with similar alternating shallow and deep grooves 49 and 50, the grooves 49 and 50 being all arcuate in a longitudinal direction and transversely curved on the same radius of curvature, the centers of curvature of the shallow grooves 49, however, lie outside the outline of the die 35, while the centers of curvature of the deep grooves 50 lie inside the outline of said dies, instead of all of the centers of curvature of the various grooves lying on the line of separation of the dies, as has been previously customary. It will be further noted that the shallow grooves 47 are opposite the deep grooves 50 and the shallow grooves 49 are opposite the deep grooves 48.

Referring to Fig. 3 it will be noted that a groove 47 has the transversely curved wall 51 thereof curved about the center 52 and that the transversely curved wall 53 of the opposite groove 50 is also curved about the same center 52. However, it will be noted that the center of curvature of the wall portions 51 and 53 lies within the die 35, but externally of the die 25. Similarly the center 54 of the transversely curved wall portions 55 and 56 of the grooves 48 and 49 lies within the die 25, but externally of the die 35. The deep grooves 50 and 48 have substantially straight wall portions 57 and 58, respectively, that lie outwardly of the centers 52 and 54 and these straight wall portions 57 and 58 meet the curved wall portions of the shallow grooves 47 and 49 in curved edges 59 and 60.

The rod-like members 39, as they roll along between the dies 25 and 35 as the rotating die 25 rotates in a clockwise direction, as viewed in Fig. 1, will gradually have formed thereon ball formations, a rod with a partially formed ball formation 61 being shown in Fig. 1 with a connecting portion 62 joining adjacent ball formations. When said rod-like members have traveled to the exit end 37 of the die 35 the balls will be separated from each other. A separate die member 35' is provided mounted between the abutment 46 and the end 37 of the die 35. This die 35' is made with grooves exactly like in the die 35, but it will be noted that the die 35' is the same distance from the die 25 at the exit end 37' thereof as at the entrance end thereof adjacent the end 37 of the die 35. Said die 35' thus finishes the forming of the balls, perfecting the rounding thereof, one of the finished balls being shown at 63 ready to be discharged from the machine. The balls 63 are discharged through the flaring opening 64 onto any suitable means, such as the chute 65, discharging into the receptacle 66. A deflector member having a finger 67 extending into each of the grooves is provided for directing the balls into the chute.

In Figs. 4 to 9, inclusive, is shown a machine for forming steel balls in which my invention is applied to a pair of roller dies. Said machine has a main frame 70 and a sub-frame 71. The sub-frame 71 is provided with a shaft 72 mounted in suitable bearings provided on said frame, which shaft is driven by a motor or other suitable driving means, and has a pinion 73 fixed thereon to rotate therewith. Said frame also is provided with bearings for a pair of shafts 74 and 75, which have the gears 76 and 77 mounted thereon that mesh with the pinion 73 and are driven thereby. Thus the shafts 74 and 75 rotate in the same direction. It will be noted that the pinion 73 has a very broad face so that the two gears 76 and 77, which are out of alignment, can mesh therewith. The shafts 74 and 75 have suitable spacing sleeves 78 mounted thereon, and are connected with roller shafts 79 and 80 by means of the couplings 81 and 82.

Meshing with the gear 77 is a gear 83, which is fixed on a shaft 84 mounted in suitable bearings on the frame 71. Said shaft 84 is connected with a shaft 85 by means of a coupling 86. Said shaft 85 is a cam shaft that operates feeding mechanism to be described below.

Figure 6:
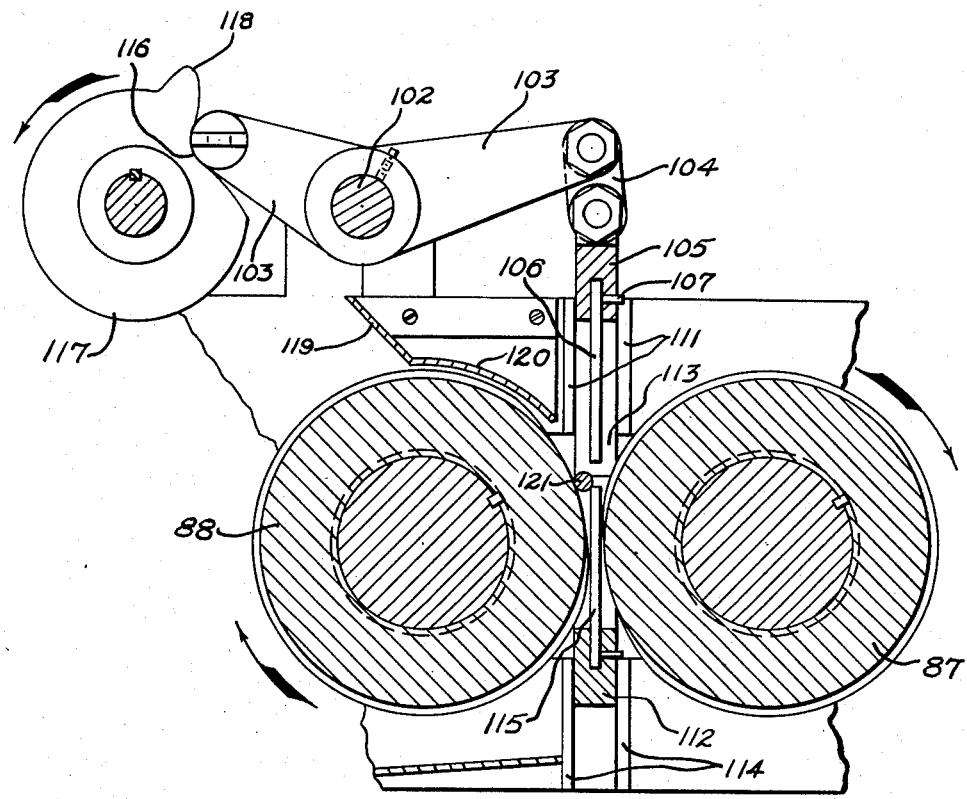
Fig. 6 is a vertical sectional view, partly broken away, through the roller dies and portions of the feeding mechanism, showing a blank being fed into position between the roller dies.
Figure 9:
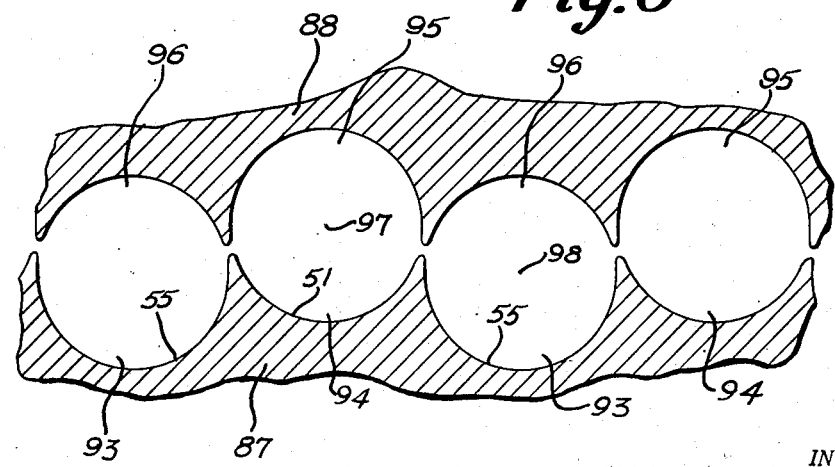
Fig. 9 is fragmentary sectional view through the roller dies, on an enlarged scale.
Figure 7:
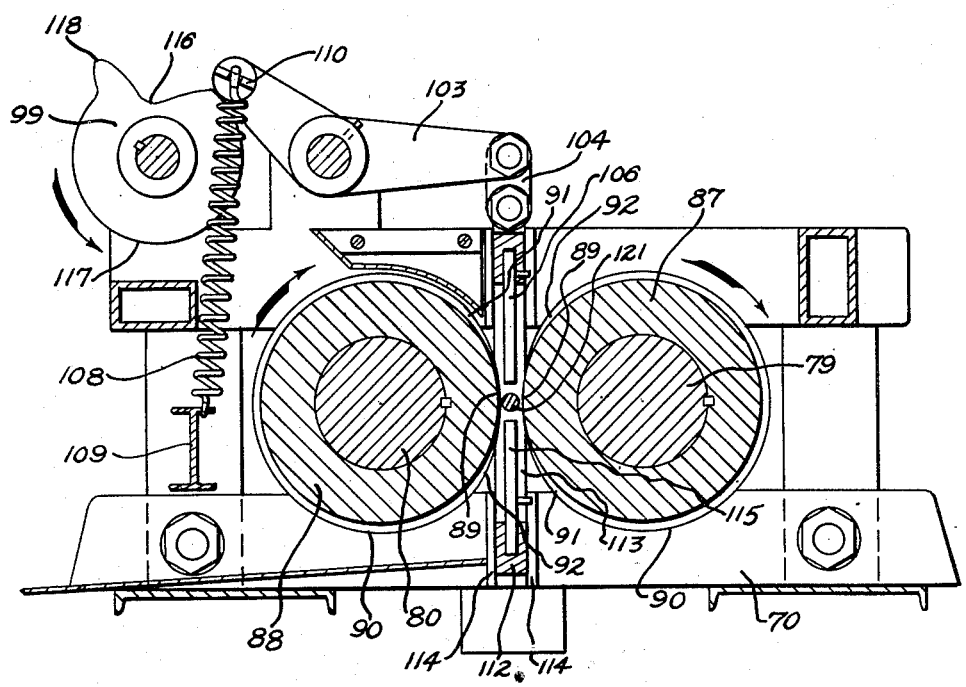
Fig. 7 is a vertical sectional view through the roller dies and feeding mechanism, showing the blank in position to be operated on by the roller dies.
Figure 8:
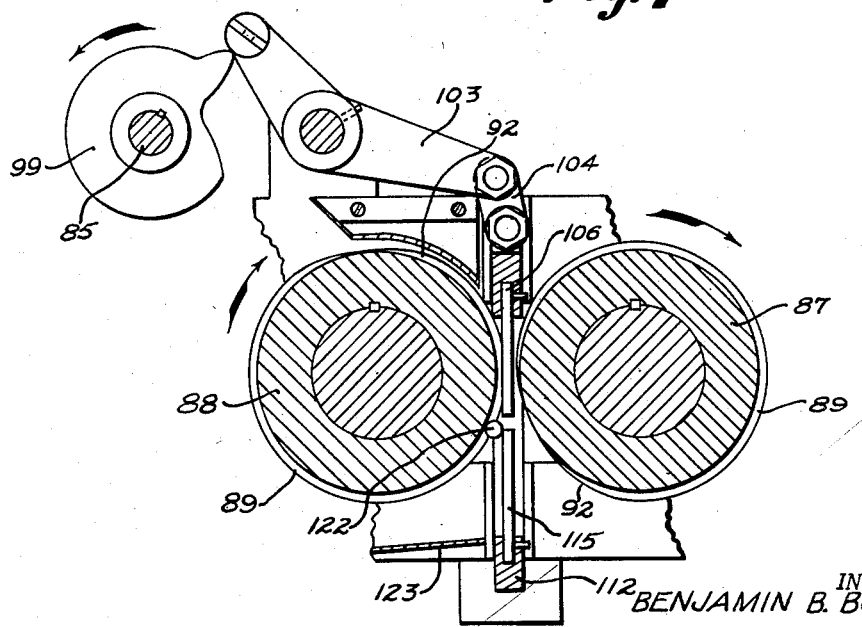
Fig. 8 is a view similar to Fig. 6, showing the position of the parts when the balls are being discharged from between the roller dies.
Figure 10:
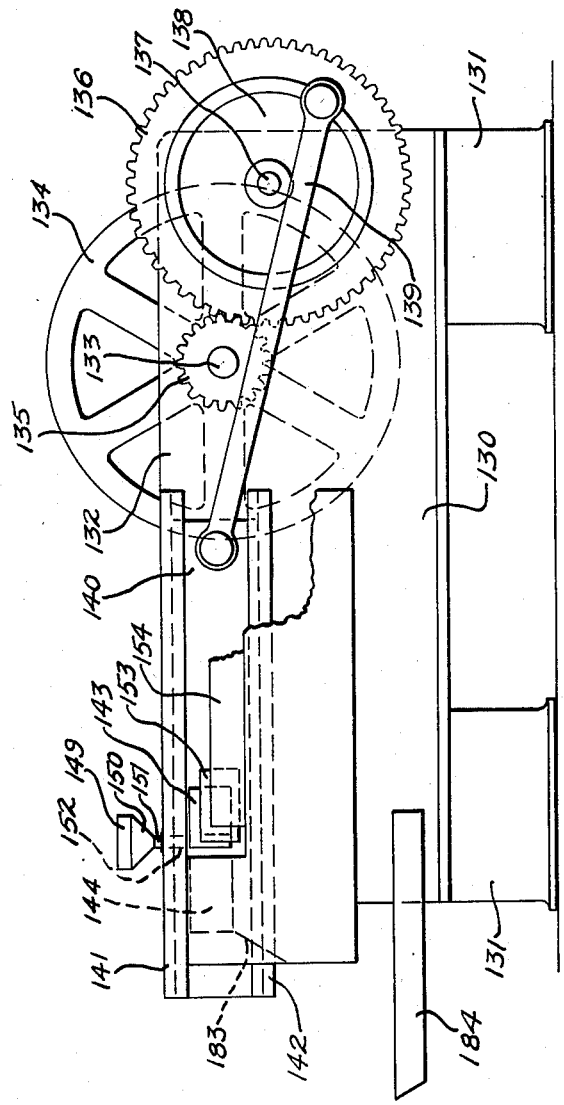
Fig. 10 is a view in side elevation of a ball rolling machine utilizing a pair of relatively reciprocating dies, partly broken away.

Mounted on the shaft 79 is a roll 87 and mounted on the shaft 80 is a roll 88, the rolls rotating in the direction indicated by the arrows in Figs. 6, 7 and 8. Each of said rolls is provided with a cylindrical or ungrooved portion 89 and with a grooved portion 90, the grooved portions being connected with the ungrooved portions by portions of gradually increasing diameter 91 and portions of gradually decreasing diameter 92 at opposite ends of said grooved portions.

The ball forming portions of said rolls are the grooved portions thereof and each of said grooved portions is provided with alternating deep and shallow grooves, similar to the deep and shallow grooves in the roller die 25, the roller 87 having deep grooves 93 alternating with shallow grooves 94 and the roller die 88 having deep grooves 95 alternating with shallow grooves 96, the deep grooves 93 cooperating with the shallow grooves 96 and the deep grooves 95 cooperating with the shallow grooves 94.

Each of the grooves 93 and 95 are of the same shape as the grooves 48 in the die 25, and each of the grooves 94 and 96 are of the same shape as the grooves 47 of the die 25. The centers of curvature of the die portions 94 and 95 are indicated at 97 and the centers of curvature of the die portions 93 and 96 are indicated at 98 in Fig. 9. The same reference numerals are applied to corresponding parts of the grooves 93, 95 and 48 and to the corresponding parts of the grooves 47, 94 and 96. It will be noted that the center 97 of transverse curvature of the grooves 94 and 95 lies outside the periphery of the roller die 88, but within the periphery of the roller die 87, and that the center 98 of transverse curvature of the grooves 93 and 96 lies outside the periphery of the roller die 88 but inside the periphery of the roller die 87.

Any suitable means for feeding lengths of rod between the roller dies 87 and 88 may be provided. That illustrated comprises a pair of cams 99 mounted on the shaft 85, each of which has a roller 100 engaging the same. The rollers 100 are mounted on levers 101, which are fixed on a shaft 102, from which the levers 103 extend, said levers 103 having links 104 pivotally connected therewith, and with upstanding ears on a bar 105 that has a row of rod-like members 106 depending therefrom. Said rod-like members are pinned to the bar 105 by means of pins 107, or other suitable securing means are provided for holding said rod-like members in position in the bar 105. A spring 108 is provided, connected with a cross member 109 of the frame and an ear 110 provided on one of the levers 101, for holding the cam roller 100 in engagement with the cam surface of the cam 99 and for returning the parts to the position shown in Fig. 6.

The frame member 105 operates between a pair of guide ribs 111 on the frame and a lower bar member 112 is connected with the bar member 105 by means of vertically extending end members 113 so that said bar 112 moves with the bar 105 in a vertical direction, guide ribs 114 being also provided for the bar 112. Said bar 112 also has a row of rod-like members 115 mounted therein, in a similar manner to that in which the rod-like members 106 are mounted in the bar 105. There is a rod-like member 106 and a rod-like member 115 corresponding to each of the grooves of the rollers 87 and 88. Said rod-like members serve to feed the blanks into proper position for operation of the rollers 87 and 88 thereon and to discharge the balls from the machine after the same have been formed.

The cam 99 rotates in the direction indicated by the arrow thereon in Figs. 6, 7 and 8. It has a low portion 116, an intermediate portion 117 and a high portion 118. When the parts are in the position shown in Fig. 6 the roller is in engagement with the low portion of the cam and the rod-like members 106 and 115 are in position for a blank to be fed to the machine. The blanks are fed in a heated condition into a hopper 119, which has a downwardly curved bottom wall 120, down which the rod-like blanks 121 roll, the roller 88 aiding in directing the rod-like blank 121 into position adjacent the upper ends of the rods 115 as shown in Fig. 6. As the roller travels up the surface of the cam from the low portion 116 to the intermediate portion 117 thereof, the rod-like members move to the position shown in Fig. 7 and the blank 121 moves into position between the portions 89 of the rollers 87 and 88 and will be rotated in this position by means of the rollers, which are traveling in opposite directions at their points of contact with the bar-like member 121, holding the bar-like member in the position shown in Fig. 7. This position of the bar-like member 121 is maintained as the rising surfaces 91 of the two rollers engage therewith and the grooved portions of the rollers then act on the rod-like member 121 to roll ball formations thereon in a similar manner to that previously described, and said ball formations are separated from each other to form separate spherical members or balls 122. Just before the receding portions 92 of the rollers 87 and 88 move into position opposite each other during the rotation of said cooperating rollers 87 and 88 the roller 100 engages the rising surface of the cam connecting the portion 117 with the high portion 118 thereof, causing the parts to be moved to the position shown in Fig. 8, the rod-like members pushing the balls 122 downwardly and said balls passing to one side of the rod-like members 115 and into a chute 123.

Due to the fact that the grooves 93, 94, 95 and 96 in the grooved portions 89 of the rollers 87 and 88 have their centers of curvature alternately offset in opposite directions or are alternately deep and shallow, with the deep grooves of the one roller lying opposite the shallow grooves of the other roller, the portions of the rod-like member 121 that lie adjacent each other will, during engagement with the grooved portions of the rollers, be rotated about different axes that are offset from each other and will rotate about various axes after the same are separated from each other and formed into balls, thus providing a more truly spherical ball member than would otherwise be possible with a pair of grooved rollers, and providing a more clean separation of the ball formations from each other without any mal-formations therein at the points where the same had been previously joined.

In Figs. 10 to 16, inclusive, is shown a machine for forming steel balls, in which my invention is applied to a pair of relatively reciprocating ball rolling dies. Said machine has a base frame 130 mounted on supports 131 and said frame has an upstanding portion 132 that is provided with suitable bearings for a shaft 133, upon which is fixed to rotate therewith a flywheel 134, which may also serve as a drive pulley, over which any suitable driving means, such as a belt or belts may operate. On the shaft 133 is fixed a gear 135, which meshes with a large gear 136 that is fixed on the shaft 137. Fixed to rotate with the shaft 137 is a crank disk 138, which has the pitman 139 pivotally connected therewith at one end thereof.

The other end of the pitman 139 is connected pivotally with a slide 140 mounted in suitable guides 141 and 142 provided in the frame, and said slide 140 has a reciprocable die 143 mounted thereon, said die 143 cooperating with the stationary die 144 in a manner to be described below. The reciprocable die 143 is, preferably, mounted in a carrier 145, which has a suitable guide projection 146 thereon operating in a guide groove in the frame portion 147, as will be obvious from Figs. 12 and 13. The stationary die 144 is mounted in a similar mounting member 148, which may be integral with the frame or detachable therefrom, as may be desirable.

Suitable means is provided for feeding heated pieces of rod constituting blanks for forming a plurality of balls manually into the machine, the means for providing the proper feeding of said lengths of rod into the machine being illustrated as comprising a funnel-like feed hopper 149 having a tapering bottom wall 150 leading to a tubular member 151 that connects with a passage 152 in the frame of the machine leading toward the dies. The pieces of rod will be fed lengthwise through the passage 152 in a downward direction by gravity after the same are discharged into the hopper 149. The means for putting the lengths of rod, serving as the blanks, into position for engagement between the dies to be rolled by said dies into balls comprises a starting finger 153, which is mounted on a reciprocable bar 154 suitably guided in the frame. Said starting fingers may be provided with a foot portion 155, which prevents downward movement of the blank 156 beyond the position at which it is to be fed into the dies and may have a vertical flange 157 thereon for preventing the tilting of the blank out of vertical position. In Fig. 14 the position of the dies 143 and 144 is shown as the blank is being fed into the machine, and it will be noted that the blank is confined sufficiently between the forward end of the die 143 and the flange 157 to hold it in a substantially vertical position after it has been fed downwardly through the passage 152.

A very short reciprocating movement of the starting finger 153 is required and this is accomplished by the mechanism shown in Fig. 11, which comprises a cam 158 mounted on the shaft 137. A roller 159 cooperates with said cam, it being mounted on a lever 160 that is pivoted on the frame, and that is connected by means of a long rod-like link 161 that is adjustable in length pivotally with one end of the lever 162. In order to hold the roller 159 in engagement with the cam a spring 163 is provided between one end of the lever 160 and an ear 164 on the frame. The lever 162 is pivotally mounted on the frame 165 and is pivotally connected with a link 166 that in turn is pivotally connected with the starting finger actuating arm 154, to which the starting finger 153 is secured in fixed position to reciprocate therewith.

The cam 158 has a high portion 167 that extends the major portion of the distance around the cam, and a low portion 168 that is relatively short, connected by the inclined portions 169 and 170. Assuming that the cam 158 is rotating in the direction indicated by the arrow in Fig. 11, the roller 159 will engage the high portion 167 of the cam until the descending portion 170 is reached, whereupon it will drop to the low portion 168 of the cam, this causing the lever 160 to swing in a counter-clockwise direction about its pivot and the lever 162 to swing in a clockwise direction about its pivot. This will cause the slide or starting finger actuating arm 154 to move to the right, as viewed in Fig. 11. It will remain in this position until the rising portion 169 of the cam is reached, whereupon a quick movement back to the position shown in Fig. 11 takes place.

Figure 12:
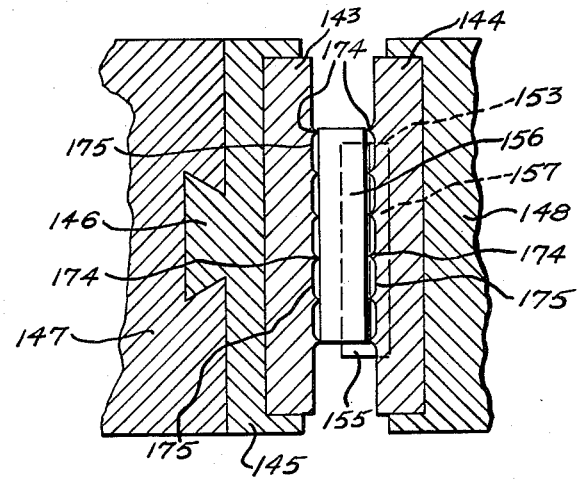
Fig. 12 is a vertical sectional view through the dies adjacent the entrance end thereof at the beginning of the rolling operation, the mounting for the dies being broken away.

It is during the time that the roller 159 is in engagement with the low portion 168 of the cam that the blank 156 is fed through the passage 152 into the position shown in Fig. 14 and also in Fig. 12, into engagement with the foot portion 155 on the starter finger. It can not drop down below the top of the starter finger 143 until the cut away portion 171 thereof is reached, whereupon the blank will drop down on the shelf or ledge 155. As soon as the portion 169 of the cam is engaged by the roller, the roller is again swung clockwise, moving the link 166 to the left and the starter finger 153 rapidly and quickly to the left, as viewed in Figs. 11 and 14, pushing the blank 156 into engagement with the entrance corner 172 of the stationary die 149, it being already in engagement with the entrance corner 173 of the movable die 143. The blank 156 is immediately scored sufficiently by the dies to be held in position between the same and then rolls along between the dies without any necessity of being held or otherwise pushed. In Fig. 14 the parts of the starter mechanism have moved substantially to the end of their stroke to the left.

Figure 13:
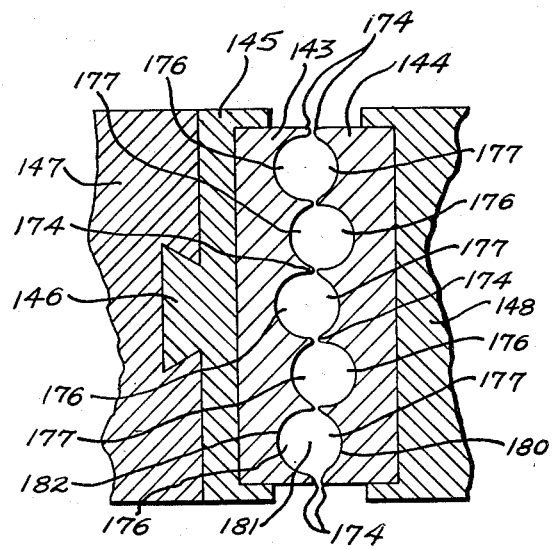
Fig. 13 is a similar view of the exit end of the dies in their position just prior to the end of the ball rolling stroke.

The dies 143 and 144 are substantial duplicates, except that the one is the reverse of the other in a manner to be described below. The entrance end of both dies have uniformly spaced tapering projections 174 thereon that define shallow grooves 175 between the same. The grooves gradually deepen toward the discharge end of the dies and also gradually widen so that the same gradually fan out, as will become evident from Figs. 12, 13 and 16. In Fig. 16 the die 144 is shown, but the dies 143 and 144 are arranged oppositely so that the starting end 173 of the die 143 is at the opposite end thereof from the starting end 172 of the die 144. Thus as the dies move from the position shown in Fig. 14 to that shown in Fig. 15 the widening and spreading grooves in the dies will gradually deepen and widen and spread apart as the blank in its rolling movement between the dies contacts progressively further along portions of the dies away from the starting ends 172 and 173 thereof. Each die, while having the grooves 175 therein gradually deepen toward the discharge end thereof, has alternate grooves changing in depth at a different progressive but uniform rate, so that as the dies approach the discharge ends thereof there will be alternating deep grooves 176 and shallow grooves 177 therein, but the deep grooves 176 of one die will be lying opposite the shallow grooves 177 of the other die. The dies also gradually thicken toward their discharge ends 178 and 179 so that the projecting portions 174 between the grooves gradually increase in height and thus gradually approach each other until the same are in close proximity, as shown in Fig. 13.

The shallow grooves 177 have transversely curved wall portions 180 that are curved about the center 181, and the deep grooves 176 have transversely curved wall portions 182 that are curved about the same center at the discharge end of the dies. The centers of curvature of the shallow portions of the dies 177 lie outside the dies in which said shallower grooves 177 are provided, but the centers of curvature of the deeper grooves 176 lie within the dies in which said deeper grooves are provided. As the deep and shallow grooves alternate with each other lengthwise of the dies from the starting ends thereof, it will be obvious that as said blanks 156 are rolled between the dies, different portions of said blanks will be rotating about different axes, the axes of rotation of adjacent portions of said blanks being offset from each other. This will cause the portions of the blank to be separated from each other by a combined twisting motion and shear as the discharge ends of the dies are approached and the last portions of the grooves in the dies will be operating on separated blank portion to roll the same into a spherical shape, the rotation of the separated parts being each about a different axis due to the fact that the centers of curvature of each of the grooves are alternately offset in opposite directions. The relationship of the grooves in the paired dies, one of which reciprocates relative to the other, in the form of the invention shown in Figs. 10 to 16, inclusive, is the same as in the other forms of dies previously described.

Any suitable means for discharging the balls may be provided. The reciprocable die 143, preferably, moves through a distance such that the discharge end 178 thereof moves past the discharge end 179 of the stationary die 144, as shown diagrammatically in Fig. 15, thus releasing the balls, which may roll down an inclined surface provided at 183 on the machine into a receptacle 184 provided for said balls.

As the blank consisting of a piece of rod 156 heated to the proper temperature is rolled between the dies by the movement of the die 143 relative to the die 144 it is gradually extended into a plurality of formations connected by reduced portions and shortly prior to separation into balls the blank has become a series of connected ball formations, the connections being relatively thin or narrow neck portions, which are, by further rolling, severed by a combination of shear and torsion. The ball is made of a rod which, preferably, is of substantially the diameter of the finished ball. Accordingly the spacing of the projecting ridges or ribs 174 at the entrance end of the dies is approximately two-thirds that at the discharge end of the dies and the blank is cut of a length so that it is two-thirds of the sum of the diameters of the balls formed therefrom. Accordingly as long as the ball formations are connected, those portions of the ball formations that engage the deepest portions of the grooves 176 and 177 are of the diameter of the original blank, but the portions between these portions of original diameter are reduced in size and extended axially so as to gradually space the centers of the ball formations further apart as the rolling progresses until the point of separation into the separate balls takes place. This occurs just prior to the time that the discharge or rear end of the movable die passes the discharge or rear end of the stationary die, whereupon the separated balls are passed from the machine in the manner previously described.

What I claim is:

1. In a machine for making steel balls, a pair of relatively movable dies, means for feeding a rod-like blank transversely of its length into said dies with its length extending transversely of the work engaging surfaces of said dies, and means for relatively moving said dies in a direction to relatively move said work engaging surfaces transversely of the length of said blank and rotate said blank bodily between said dies, each of said dies having elongated alternating shallow and deep grooves in its work engaging surface situated side by side transversely of their length and of said surface to engage longitudinally adjacent portions of said blank, the deep grooves of one die being positioned opposite the shallow grooves of the other die so that the alternating grooves in said dies will cause longitudinally adjacent portions of said blank to rotate about different axes by said relative movement of said dies.

2. In a machine for making steel balls, a pair of relatively movable dies, means for feeding a rod-like blank transversely of its length into said dies with its length extending transversely of the work engaging surfaces of said dies, and means for relatively moving said dies in a direction to relatively move said work engaging surfaces transversely of the length of said blank and rotate said blank bodily between said dies, each of said dies having elongated alternating shallow and deep transversely concave grooves in its work engaging surface situated side by side transversely of their length and of said surface to engage longitudinally adjacent portions of said blank, the deep grooves of one die being positioned opposite the shallow grooves of the other die so that the alternating grooves in said dies will cause longitudinally adjacent portions of said blank to rotate about different axes by said relative movement of said dies, said grooves all having the same radius of transverse curvature.

References Cited in the file of this patent

UNITED STATES PATENTS

| | | |
|---|---|---|
| 418,562 | Gould | Dec. 31, 1889 |
| 617,610 | Stoff | Jan. 10, 1899 |
| 1,225,765 | Canda | May 15, 1917 |
| 1,505,964 | Marcy | Aug. 26, 1924 |
| 2,048,917 | Brandt et al. | July 28, 1936 |

FOREIGN PATENTS

| | | |
|---|---|---|
| 234,303 | Germany | Jan. 21, 1910 |
| 464,081 | Great Britain | Apr. 12, 1937 |
| 739,124 | France | Jan. 5, 1933 |